US012727717B2

(12) United States Patent
Beckmann

(10) Patent No.: US 12,727,717 B2
(45) Date of Patent: Sep. 8, 2026

(54) CONTAINER ARRANGEMENT FOR A KITCHEN APPLIANCE

(71) Applicant: Vorwerk & Co. Interholding GmbH, Wuppertal (DE)

(72) Inventor: Nils Beckmann, Remscheid (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 785 days.

(21) Appl. No.: 18/177,361

(22) Filed: Mar. 2, 2023

(65) Prior Publication Data

US 2023/0277000 A1 Sep. 7, 2023

(30) Foreign Application Priority Data

Mar. 7, 2022 (EP) .................................... 22160540

(51) Int. Cl.
*A47J 43/07* (2006.01)

(52) U.S. Cl.
CPC ................................ *A47J 43/0777* (2013.01)

(58) Field of Classification Search
CPC .. A47J 43/046; A47J 43/0465; A47J 43/0716; A47J 43/075; A47J 43/0761; A47J 43/0766; A47J 43/0772; A47J 43/0777; A47J 43/085
See application file for complete search history.

(56) References Cited

U.S. PATENT DOCUMENTS

| | | | | |
|---|---|---|---|---|
| 6,629,492 | B1 * | 10/2003 | Li | A47J 43/0777 366/601 |
| 10,357,749 | B2 * | 7/2019 | Fleming | A47J 43/0772 |
| 10,939,784 | B2 * | 3/2021 | Haney | A47J 43/0777 |
| 12,268,335 | B2 * | 4/2025 | Antkowiak | H02J 50/90 |
| 2004/0100862 | A1 | 5/2004 | Arroubi et al. | |
| 2018/0020875 | A1 | 1/2018 | Kolar et al. | |

FOREIGN PATENT DOCUMENTS

| | | | | |
|---|---|---|---|---|
| CN | 1681427 | A | 10/2005 | |
| CN | 1964655 | A | 5/2007 | |
| CN | 166711972 | A | 9/2023 | |
| DE | 19729662 | A1 * | 1/1999 | A47J 36/32 |
| DE | 19947466 | A1 * | 5/2001 | A47J 43/046 |
| EP | 3666140 | A1 | 6/2020 | |
| JP | 20104913 | A | 1/2010 | |
| WO | 2017118379 | A1 | 7/2017 | |
| WO | 2020191437 | A1 | 10/2020 | |

* cited by examiner

*Primary Examiner* — Hung D Nguyen
(74) *Attorney, Agent, or Firm* — The Webb Law Firm

(57) ABSTRACT

The application relates to container arrangement for a kitchen appliance including a food receiving element, and at least one lid, the lid is movable between a first and a second operating position, the lid includes at least one reading antenna connected to a first and a second lid contact, the lid includes at least one transponder positioned within range of the reading antenna, the food receiving element includes at least a first pot connection extending between a first upper and lower pot contact and a second pot connection extending between a second upper and lower pot contact, the first and second lower pot contacts may electrically connect to a reading controller, the first and second lid contacts are arranged such that an electrical connection is established between the first and second lid contacts and the first and second upper pot contact and only in the second operating position.

13 Claims, 6 Drawing Sheets

CONTAINER ARRANGEMENT FOR A KITCHEN APPLIANCE

CROSS-REFERENCE TO RELATED APPLICATION

This application claims priority to European Patent Application No. 22160540.5 filed Mar. 7, 2022, the disclosure of which is hereby incorporated by reference in its entirety.

BACKGROUND OF THE INVENTION

Field of the Invention

The application relates to a container arrangement for a kitchen appliance comprising a food receiving element and a lid corresponding thereto. The application also relates to a kitchen appliance and a method.

Description of Related Art

From the prior art kitchen food processors are known, which are configured to prepare food at least semi-automatically. Such food processors, but also other kitchen appliances, may comprise at least one container arrangement. A container arrangement may comprise a food receiving element, for example in the form of a pot, and at least one lid. The lid is configured to close and cover, respectively, the pot opening of the food receiving element. The lid can also enable or be used for other functions.

In particular, it may be necessary for a safe operation of a kitchen appliance that the lid is in a specific operating position with the food receiving element, in particular that it can be locked. It is therefore known from the prior art that a lid can be moved relative to a food receiving element from a first operating position, such as an unlocked operating position, to a second operating position, such as a locked operating position. For example, the user may move the lid accordingly or the kitchen appliance may comprise a lid drive configured to (automatically) move a lid at least between the unlocked position and the locking position.

SUMMARY OF THE INVENTION

The conduction of a specific kitchen appliance function by a kitchen appliance is regularly only permissible when a lid on the food receiving element is in a specific operating position, in particular the locking position, i.e., the container arrangement is in a second operating state, in particular the locking state.

In order to recognize and detect, respectively, a locking state of a container arrangement it is known from (internal) prior art to use microswitches. For example, the locking position of the lid can be detected by interrogating the position of the locking rollers of the food receptacle element/lid by means of the microswitches in combination with an evaluation of the current requirement of the lid drive. In addition, a microswitch is usually used which must be actuated by a locked lid.

Furthermore, concepts are known from the prior art that also detect a lid in the locking position by means of electrical switches. Depending on the kitchen appliance such an electrical switch is actuated directly by the lid or indirectly via mechanical plungers, levers or the like.

However, these detection mechanisms have various disadvantages. In particular, the effort of implementation is costly. This is in particular true in the case when the kitchen appliance comprises a plurality of container arrangements and/or the container arrangement comprises a plurality of lids.

In the known detection mechanisms, in order to transmit the locking information from a lid area to a detection device arranged in an appliance base, a transmission path must be provided which transmits the locking information to the respective coupling point of the appliance base. Furthermore, the locking information must be provided in the form of one or more electrical signals so that the detection device can evaluate this information in order to be able to detect the locking state.

The different known detection mechanisms can essentially be divided into two groups. The classification can depend in particular on the point of the kitchen appliance at which the electrical signal is generated that contains and/or represents the locking information (i.e., in particular: lid is in the locking position).

In the first group, the locking information is mechanically transmitted between the container arrangement and the appliance base of the kitchen appliance. The conversion into an electrical signal only takes place in the appliance base.

A respective detection mechanism, in particular with different pot and food receiving element diameters, respectively, is associated with the challenge of transmitting the mechanical movement to the correct position of the appliance base. The mechanical transmission elements required for this are subject to a high risk of contamination due to the moving parts. In particularly unfavorable cases, contamination can cause the mechanical mechanism to jam and/or block. This in turn can lead to a faulty locking detection.

In addition, cleaning of the mechanical mechanism can be difficult, in particular when filigree, mechanical structures are used for reasons of installation space.

If, in addition to the locking state of the container arrangement, a possibility is to be provided to determine the lid type from a plurality of possible different lid types (e.g., in the case of several different lids per pot), the detection signal must be codable in a suitable manner.

In the case of mechanical scanning of the lid, this leads to a significant additional effort. The reason for this is in particular that for transmitting the additional information either the number of signals must be increased (which requires additional mechanical transmission mechanisms) or a mechanical movement of an element of the mechanical mechanism must be evaluated in more detail (e.g., different plunger strokes depending on the type of lid).

Depending on the design, mechanical transmission elements also entail an increased risk of manipulation. For example, the corresponding switches and/or mechanisms can be manually operated by a user to feign locking. Additional mechanical structures are required to prevent this. This in turn makes cleaning even more difficult and also increases the implementation effort.

In the second group, the locking state of the lid is transmitted electrically between the container arrangement and the appliance base. In other words, the conversion into an electrical signal already takes place at the container arrangement. Due to the environmental conditions (e.g., moisture, dirt, temperature, dishwasher environment) to which a container arrangement is regularly exposed, scanning the lid using microswitches is problematic. The reason for this is that the microswitches require a seal. This leads to an increased implementation effort. In addition, a seal is a wear element. Wear can have a particularly negative effect on the service life of the container arrangement.

The described detection mechanisms thus have disadvantages in the fields of robustness, complexity and/or installation space.

Therefore, the object of the application is to provide a possibility for detecting a second operating state, in particular a locking state, in a container arrangement for a kitchen appliance, which is more robust and/or simpler and/or requires less installation space.

This object is solved in accordance with a first aspect of the application by a container arrangement for a kitchen appliance. The container arrangement comprises a food receiving element. The container arrangement comprises at least one lid configured to close an opening of the food receiving element. The lid is movable relative to the food receiving element between a first operating position and an (second) operating position different from the first operating position. The lid comprises at least one reading 30 antenna connected to a first lid contact and a second lid contact. The lid comprises at least one transponder arranged within a range of the reading antenna. The food receiving element comprises at least a first pot connection extending between a first upper pot contact and a first lower pot contact, and a second pot connection extending between a second upper pot contact and a second lower pot contact. The first lower pot contact and the second lower pot contact are configured to electrically connect to a reading 5 controller. The first lid contact and the second lid contact are arranged such that an electrical connection between the first lid contact and the first upper pot contact and an electrical connection between the second lid contact and the second upper pot contact are established only in the second operating position.

In contrast to the prior art, according to the application a possibility is provided for detecting a second operating state, in particular a locking state, of a lid of a container arrangement for a kitchen appliance, which is designed to be more robust and simpler and in particular requires less installation space, in that both a reading antenna and a transponder which can be read by the reading antenna and is within a range of the reading antenna are arranged in the lid, wherein the reading antenna is applicable with an antenna signal only when the lid is in the second operating position, in particular in the locked operating position. Only in the second operating position of the lid the circuit is closed between the reading controller and the reading antenna.

The container arrangement according to the application is configured for a use in a kitchen appliance. The kitchen appliance is in particular a food processor configured to prepare food. The preparation can be at least partially automated.

The container arrangement comprises at least one food receiving element and at least one first lid corresponding structurally to the food receiving element. This means in particular that a (pot) opening is closeable and coverable, respectively, by the first lid and the lid is in particular placeable on the pot opening.

A food receiving element is in particular configured to receive food and is preferably a pot, also called a cooking pot, a pan or the like. In particular, according to the application, a food receiving element is understood to be a fillable vessel or a fillable container which is configured to prepare food or beverages, in particular to cook or boil hot food.

Preferably, the food receiving element corresponds (structurally) to an appliance base of the kitchen appliance. For example, the food receiving element can be at least partially made of plastic, at least partially made of metal and/or at least partially made of glass.

According to the application, a lid means in particular a closure element and/or cover element with which the opening of the food receptacle element is at least partially (e.g., completely) closeable and coverable, respectively. Complete means in particular that the lid is properly and completely, respectively, placed on the opening of the food receptacle element. The lid can in turn comprise its own lid opening, for example for an arrangement, in particular coupling, of an accessory, such as a measuring cup or the like. Accordingly, the further lid opening can be closed. An opening of the food receiving element may be completely closed at least when a lid is properly placed and a further accessory is properly arranged in a lid opening. It shall be understood that lids without openings or with other integrated functions can also be used.

According to the application, the lid is movable between at least a first operating position and a second operating position. The first operating position can be a lid position in which the container arrangement is not ready for operation, and the second operating position can be a lid position in which the container arrangement is ready for operation. In the first operating position, the lid is positioned in particular non-operationally at respectively on the food receiving element. The lid and the container arrangement, respectively, is in particular in a first operating state. In the second operating position, the lid is positioned in particular ready for operation at respectively on the food receiving element. The lid and the container arrangement, respectively, is in particular in a second operating state.

Preferably, the lid can be locked to the food receiving element. In particular, the first lid is movable relative to the food receiving element between an unlocked position and a (defined) locking position. In the locking position, the lid and the container arrangement, respectively, is in a (mechanical) locking state. A locking according to the application is in particular a mechanical locking and blocking, respectively, of the lid.

Preferably, the container arrangement may comprise at least one (mechanical) locking mechanism configured to lock the first lid to the food receiving element in a locking position and locked position, respectively, of the lid. For example, the locking may be established via at least one clamping element (e.g., roller) arranged on the food receiving element (in a known manner). In particular, a bayonet-type locking device may be provided. It shall be understood that other locking mechanisms may be used.

A lid can be moved automatically by a lid drive and locking actuator, respectively, or manually by a user action from the first operating position to the (defined) second operating position.

According to the application, it has been recognized that a second operating state, in particular a locking state, can be detected in a simple manner by arranging a reading antenna in or on the lid, which can only be supplied with electrical energy respectively can only be supplied with an antenna signal when the lid is in a specific (second) operating position, in particular the locked operating position. Thus, only in the second operating position of the lid the reading antenna can emit electromagnetic signals, in particular in the form of a reading field (also called interrogation field). In other words, a transponder (also referred to as a tag) arranged in or on the lid can only be read by the reading antenna of the lid when the lid is (properly) positioned on the food receiving element, in particular when it is locked.

Preferably, a system is implemented in the lid that is formed by a reading antenna and a transponder corresponding to the reading antenna. The system is in particular an RFID (radio-frequency identification) system. The reading antenna is preferably an RFID-based reading antenna. The transponder is preferably an RFID-based transponder and RFID tag, respectively.

The transponder is arranged on respectively in the lid in such a way that the transponder is within the (reading field) range of the reading antenna of the lid. In particular, this means that the distance of the transponder to the reading antenna and the geometric orientation of the transponder to the reading antenna are such that the transponder can (always respectively under all circumstances) be read by a reading field emitted by the reading antenna.

The lid comprises two lid contacts, each of which is electrically connected to the reading antenna. This can be used to supply the reading antenna with electrical energy respectively to apply an antenna signal.

The two lower pot contacts are configured to electrically connect a reading controller. The reading controller can preferably be arranged in an appliance base of the kitchen appliance. In other embodiments, the food receiving element, in particular the pot, can at least partially comprise the reading controller (and thus in particular also a detection device). For example, the reading controller may be integrated in the pot if the pot is equipped with a smart interface and a corresponding (small) controller is integrated in the pot. In this case, the lower pot contacts are in particular directly connected to the reading controller.

The reading controller can be configured to provide the antenna signal. In particular, the reading controller can generate the antenna signal and apply it to the reading antenna so that a corresponding reading field is emitted by the reading antenna.

The reading controller may be configured to detect a second operating state, such as the locking state of the container arrangement, based preferably on a readable transponder (respectively depending on whether a transponder is readable (or not)). The reading controller can preferably be an RFID reader.

The upper pot contacts, which can be arranged above the lower pot contacts, in particular as seen in a vertical direction of the food receiving element, serve to electrically couple with the first lid contact and the second lid contact.

According to the application, the upper pot contacts are arranged on the food receiving element and the first lid contact and the second lid contact are arranged on the lid in such a way that an electrical connection between the respective contacts is only established when the lid is in the second operating position. If the lid is not (properly) positioned on the food receiving element, at least one electrical connection between said contacts is not established. It is not possible to apply an antenna signal to the reading antenna so that in particular it is not possible to read the transponder.

This makes it possible for the reading controller to determine (directly), in particular on the basis of a reading or non-reading of a transponder, whether the lid is in the second operating position, in particular the locking position (i.e., properly locked) or not. Thus, the electrical contact bridge arranged in the lid comprising the reading antenna only connects the first lower pot contact to the second lower pot contact when the lid is in the second operating position. In other words, the arrangement of the contacts on the lid and the food receiving element is such that the circuit is only closed when the lid is in the (defined) second operating position on the food receiving element.

Preferably, a specific appliance function of the kitchen appliance can be released for a user depending on a detected and established, respectively, second operating state (e.g., locking state respectively (correct) position state) of a lid. This means in particular that the appliance function can only be released when the second operating state, such as the locking state, of the lid is detected. Upon detection of another (e.g., first) operating state, such as a unlocked state or a non-positioning state, the appliance function (preferably all appliance functions) can be blocked and remain blocked, respectively. Safety during operation of the kitchen appliance can be improved.

According to one embodiment of the container arrangement according to the application, the reading antenna may be a first antenna coil. In particular, the antenna coil may be an RFID-based antenna coil. The antenna coil may be formed of copper. It shall be understood that other electrically conductive materials, in particular metals, may also be used, for example aluminum or the like. The number of windings of the antenna coil may preferably be between 1 and 10, more preferably between 1 and 5, most preferably 3 or 4.

Particularly preferably, the at least one winding can run along the edge of the lid and/or be bent accordingly. The at least one winding can, for example, be inserted into a lid base body in the lid during manufacturing and then provided with a cover (preferably formed from plastic). The cover can be attached to the lid base body, for example, by ultrasonic welding. In a simple manner, a reading antenna can be provided.

Alternatively or additionally, the transponder can be a passive transponder with a second antenna coil (corresponding to the first antenna coil). Passive means in particular that the transponder cannot actively transmit a transmitting field, but in particular can only manipulate a received reading field (depending on the information to be transmitted).

Passive (further) means in particular that the transponder does not have its own energy source (e.g., battery), but is supplied with energy by the reading field and transmitting field, respectively, of the reading antenna. In variants of the application, an active transponder can also be implemented. An active transponder can in particular have its own energy source, such as a battery. In this variant, the transponder is then able to actively transmit a transmitting field or react to a received reading field or received signal.

As has been described, the transponder can preferably comprise a coil as a receiving antenna. By induction, similar to a transformer, a capacitor of the transponder can be charged. This energy can be used by the transponder in particular to respond to a request contained in the reading field. This can provide a simple and reliable transponder.

Furthermore, the transponder may be positioned within the at least one winding. In other words, the at least one winding may run along the edge of the lid and the transponder may be positioned closer to the center of the lid (compared to the winding).

The transponder can, for example, be arranged on the lid with a material bond. Preferably, the transponder and in particular the second antenna coil of the transponder can be covered by a cover (in particular made of plastic).

According to a further embodiment of the container arrangement according to the application, the electrical connection between the first lid contact and the first upper pot contact and/or the electrical connection between the second lid contact and the second upper pot contact may be a contact based (respectively wire based) electrical connection.

Preferably, the two electrical connections can be of the same design. In particular, the respective contacts can be formed as sliding contacts or spring contacts.

In particular, in order to further reduce the manufacturing effort and to allow easy cleaning in case of contamination, the first lid contact and the second lid contact may be exposed electrical contacts, according to a further embodiment of the container arrangement according to the application. Preferably, at least the first upper pot contact and the second upper pot contact may further be exposed electrical contacts. In particular, the upper contact elements may be formed in the form of bent spring wire elements. In particular, the lid contacts may be formed in the form of bent spring wire elements. In other variants of the application, a contact may also be formed by a (bent) (spring) sheet or the like.

The lid contacts and the upper pot contacts can in particular be formed from the same electrically conductive material, preferably copper or aluminum.

Particularly preferably, the first lid contact and the second lid contact can be arranged relative to the first upper pot contact and the second upper pot contact in such a way that, when the lid is moved from the first operating position to the second operating position, the lid is guided in such a way that the first lid contact on the first upper pot contact and the second lid contact on the second upper pot contact rub against each other in contact-based manner for a specific distance (e.g. 1 mm to 10 mm).

Preferably, a first lid contact may have a first longitudinal extension in a first direction and the (associated) first upper pot contact may have a second longitudinal extension in a second direction, wherein between the first and the second direction (which are in particular in the same plane) there may be an angle between 10° and 90°, preferably of about 90°.

In particular, the lid can be guided by a pot guide during the closing movement, i.e., in particular when moving from an unlocked position to the locking position of the lid (which can take place, for example, in the form of a rotary movement) in such a way that said contacts slide against each other. It has thus been recognized that dirt can be deposited on a contact. This dirt can (significantly) impair the contact resistance between two contacts. The preferred positioning, formation and/or orientation of said contacts can scrape off any dirt that may be present. The impairment of the contact resistance can at least be reduced.

Furthermore, a (first or second) lid contact and/or a (first or second) upper pot contact and/or a (first or second) lower pot contact can preferably be back-lined with a filling material. In particular, a back lining of the penetration points of said contacts with an elastic material (e.g., silicone) can be provided. This has the particular advantage that penetration and/or accumulation of dirt at the contacts is at least reduced. Cleaning is further facilitated.

According to a further preferred embodiment of the container arrangement, the electrical connection between the first lid contact and the first upper pot contact and/or the electrical connection between the second lid contact and the second upper pot contact may be a contactless (or wireless) electrical connection. Preferably, the two electrical connections may be of the same design. The contactless electrical connection is preferably a capacitive connection. Alternatively, an inductive connection is also possible.

Particularly preferably, the first lid contact may be formed as a first lid surface element and the second lid contact may be formed as a second lid surface element. The first upper pot contact may be formed as a first pot surface element and the second upper pot contact may be formed as a second pot surface element. In the second operating position of the lid, the first lid surface element and the first pot surface element may form a first coupling capacitor and the second lid surface element and the second pot surface element may form a second coupling capacitor. In particular, said surface elements form a respective coupling capacitor only in the second operating position of the lid. In other words, only in the second operating position the antenna signal provided by the reading controller can be transmitted to the reading antenna via said coupling capacitors.

As has been described, said respective contacts are preferably formed as surface elements, for example as electrically conductive foils. The surface elements serve as electrodes of a capacitor respectively capacitor electrodes. In particular, said surface elements form a capacitor only in the locking state of the container arrangement, i.e., they are spatially superimposed and adjacent to each other, respectively.

The dielectric of a coupling capacitor is specified in particular by air and the plastic used as a cover on the food receiving element and/or lid. Liquids and/or food, which may be present on the lid and/or on the food receiving element between the capacitor electrodes, also have an influence on the capacitance. This influence can be taken into account in particular during a tolerance analysis.

Preferably, the container arrangement can comprise a plurality of (different) lids. In this context, different lids mean in particular different lid types. In one embodiment, the container arrangement can comprise a first lid and lid type, respectively, with a first appliance function and at least one further lid and lid type, respectively, with a further appliance function that differs from the first appliance function. Exemplary and non-exhaustive kitchen appliance functions and appliance types, respectively, are a first cutting function with a first maximum permissible set speed and/or set torque, a further cutting function with a second (different from the first maximum permissible set speed and/or set torque) maximum permissible set speed and/or set torque, a first stirring function with a first maximum permissible set speed and/or set torque, a further stirring function with a second (different from the first maximum permissible set speed and/or set torque) maximum permissible set speed and/or set torque, a first motor direction of rotation, a second opposite motor direction of rotation, a first set temperature and/or a first set temperature range of a heater integrated in the food receiving element, a second set temperature (different from the first set temperature) and/or a second set temperature range (different from the first set temperature range) of a heater integrated in the food receiving element, control programs and/or control program set parameters for specific operations, etc.

According to a further embodiment of the container arrangement according to the application, the transponder may comprise at least one readable memory. At least one lid identifier and/or one lid type identifier can be stored in the (data) memory. A lid identifier can uniquely identify a lid system-wide. A lid type identifier can uniquely identify a specific lid type from a plurality of lid types system wide. In one variant, the lid type identifier can be contained in the lid identifier.

The lid identifier and/or the lid type identifier can be read by the reading controller, in particular by means of the reading antenna. In particular, the transponder can be configured to respond to the receipt of a reading field with the lid identifier and/or lid type identifier.

It shall be understood that in variants of the application at least one further datum can be stored in the memory and in particular can be read (e.g., at least one permissible and/or non-permissible accessory of the lid, at least one permissible and/or non-permissible appliance function of the lid, etc.).

According to a further embodiment of the container arrangement according to the application, the container arrangement may comprise at least one accessory (e.g., varoma, stirring attachment, knife cover, measuring cup, cooking basket and the like) couplable to the container arrangement. In particular, the at least one accessory can provide an additional appliance function. Preferably, the container arrangement can comprise a plurality of different accessories and different types of accessories, respectively.

In one embodiment, the container arrangement may comprise a first accessory and a first type of accessory, respectively, with a first additional appliance function and at least one further accessory and further type of accessory, respectively, with a further additional appliance function different from the first additional appliance function. An advantage here is that an accessory can only be detected when the lid is in the second operating position, in particular in the locking position.

The accessory may comprise at least one accessory transponder. The accessory transponder can be formed according to the (lid) transponder described above.

Furthermore, according to a further embodiment of the container arrangement according to the application, the accessory transponder may be arranged on the accessory in such a way that the accessory transponder is within reach of the reading antenna in a coupling state of the accessory with the lid or the food receiving element. In other words, the accessory transponder is readable by the reading antenna of the lid at least when the accessory is (properly) positioned (in particular coupled) to the lid or the food receiving element.

Furthermore, the accessory transponder may comprise at least one readable memory. The (data) memory can store at least one accessory identifier (such as a serial number or a Universally Unique Identifier (UUID)) and/or an accessory type identifier. An accessory identifier can uniquely identify an accessory system wide. An accessory type identifier can uniquely identify a particular accessory type from a plurality of accessory types system wide. In one variant, the accessory type identifier may be included in the accessory identifier. These may be stored prior to distribution (during or at the end of production). In particular, the accessory identifier and/or accessory type identifier can be read by the reading controller by means of the reading antenna. In particular, the accessory transponder can be configured to respond to the receipt of a reading field containing the accessory identifier and/or accessory type identifier.

It shall be understood that in the case of variants of the application at least one further datum can be stored in the memory and in particular can be read (e.g., at least one permissible and/or non-permissible additional appliance function of the accessory etc. and/or origin information(s) (such as manufacturer identity, date of manufacture, place of manufacture and/or authentication information)).

According to a further embodiment of the container arrangement according to the application, the first lid contact and the second lid contact may be arranged on substantially opposite sides of the lid edge. Further, the first upper pot contact and the second upper pot contact may be arranged on substantially opposite sides of the edge of the pot.

A further aspect of the application is a kitchen appliance. The kitchen appliance comprises a container arrangement as previously described. The kitchen appliance comprises an appliance base. The appliance base comprises a reading controller (described previously) electrically coupled to a first base contact and a second base contact. The first base contact is electrically couplable to the first lower pot contact and the second base contact is electrically couplable to the second lower pot contact.

Preferably, the appliance base may have a pot receptacle corresponding to the food receiving element of the container arrangement such that an electrical connection is established between the first lower pot contact and the first base contact and an electrical connection is established between the second lower pot contact and the second base contact when the food receiving element is arranged in the pot receptacle.

The pot receptacle is configured to receive the food receiving element, in particular at least the bottom of the food receiving element. The pot receptacle may (structurally) correspond to the food receiving element of the container arrangement such that an electrical connection is established between the first lower pot contact and a first electrical base contact of the appliance base and an electrical connection is established between the second lower pot contact and a second electrical base contact of the appliance base (only) when the food receiving element is (correctly) arranged in the pot receptacle.

As has already been described, the reading controller can in particular be configured to provide an antenna signal for the reading antenna. In particular, the reading controller can be an RFID reader (e.g., formed by a microcontroller).

The reading controller can be integrated in the appliance controller or communicatively connected to the appliance controller.

According to one embodiment of the kitchen appliance according to the application, the reading controller may comprise an evaluation module configured to detect a second operating state, in particular the locking state, of the lid based on a readable transponder. In other words, a second operating state in which the lid is operatively positioned on the food receiving element, such as the locking state, can be detected by the evaluation module when a transponder is readable. If a transponder cannot be read, it can be determined by the evaluation module that a first operating state exists in which the lid is not positioned ready for operation on the food receiving element, such as a unlocked state. In particular, in this case, the circuit with the reading antenna is not closed because the lid is not in the second operating position.

Furthermore, according to a further embodiment of the kitchen appliance according to the application, the evaluation module can be configured to determine the lid type (of the lid positioned in the second operating position) based on a received respectively read lid identifier and/or lid type identifier and in particular a (predefined) lid type criterion. The lid type criterion may be stored in a data memory of the appliance base accessible by the reading controller. For example, an assignment table or the like may be provided as a lid type criterion. In the assignment table, a lid type identifier can be assigned to each (possible) lid type of the container arrangement, for example. Upon receipt of a read lid type identifier, the lid type of the lid positioned in the second operating position can then be determined. In particular, the obtained lid type identifier is compared with the stored lid type identifiers of the assignment table. If a match is found, the associated lid type can be determined and output and/or provided to a release module, for example, by a user interface. If no match is found, this information can be output by a user interface and/or provided to a release module, for example. The lid type can be determined in a simple and reliable manner.

According to a further embodiment of the kitchen appliance according to the application, the appliance base may comprise a filtering and matching network arranged between the reading controller and the first base contact and the second base contact. In particular, the filtering and matching network (e.g., formed by capacitors, coils and/or resistors) may be configured such that a (suitable) overall impedance is formed for the reading controller (preferably an RFID reader) so that in particular the antenna coil may be used as an RFID antenna. In variants of the application, the filtering and matching network can also be partially arranged in respectively on the food receiving element and/or the lid.

According to a further embodiment of the kitchen appliance according to the application, the appliance base can comprise a release module. The release module can be configured to release an appliance function of the kitchen appliance only upon detection of the second operating state (e.g., locking state) of the lid and the container arrangement, respectively. In particular, the release module may be communicatively connected to the evaluation module. For example, the release module may be integrated in the reading controller. If no corresponding operating state is detected, the at least one appliance function remains blocked. By releasing and thus executing an appliance function of the kitchen appliance, for example, only when the locking state of the lid is detected, the safety during operation of the kitchen appliance can be further improved.

Preferably, the release module can be configured to release at least one appliance function based on the determined lid type and the lid type criterion. In particular, the lid type criterion can define for which at least one appliance function a lid type is permitted. Depending on the read lid type and the (predefined) lid type criterion, only the at least one device function that is permitted for this lid type can be released. If a lid type cannot be determined, the at least one appliance function of the kitchen appliance can remain blocked. The safety can be further improved.

If the memory of the transponder of the lid stores for which at least one appliance function the lid is permitted, the release of the at least one device function can also be based on a corresponding read datum.

In the event that an accessory is coupled to the lid positioned in the second operating position (i.e., in particular, is properly arranged on the lid), the release module may further be configured to release the appliance function based (additionally) on the determined accessory type and an accessory type criterion. The accessory type criterion may be stored in a data memory of the appliance base accessible by the release module. In particular, the accessory type criterion may define for which at least one device function an accessory type is permitted. Depending on the accessory type read and the (predefined) accessory type criterion, only the at least one appliance function that is permitted for this accessory type can be released. The safety can be improved even further.

If the memory of the accessory transponder stores for which at least one appliance function the accessory is permitted, the releasing of the at least one appliance function can also be based on a corresponding read datum.

A further aspect of the application is a method for determining and detecting, respectively, a second operating position of the lid and a second operating state, respectively, in a previously described container arrangement. The method comprises:

detecting, by a reading controller, the second operating position of the lid of the container arrangement based on a readable transponder (or depending on whether a transponder is (or is not) readable (at all)).

In particular, the reading controller may be a previously described reading controller. Preferably, an appliance base of a previously described kitchen appliance may comprise the reading controller. In variants of the application, the container arrangement may also comprise the reading controller at least in part.

Preferably, the method may be used to determine a locking state in a previously described container arrangement of a previously described kitchen appliance. Preferably, the method may further be used to identify the lid type and/or accessory type as previously described.

A module, device or the like can be at least partially realized by hardware elements and/or software elements. In principle, data can be transmitted immediately or first collected and temporarily stored in order to be transmitted together at certain times, for example. Furthermore, terms such as “above”, “top”, “bottom”, “below”, etc., refer to the direction running vertically to a horizontal plane and to a container arrangement and/or kitchen appliance placed on a horizontal surface. Unless otherwise stated, expressions such as “first”, “second”, etc., are used only to distinguish two elements and do not indicate an order.

The features of the container arrangements, kitchen appliances and methods can be freely combined with each other. In particular, features of the description and/or the dependent claims may be independently inventive, even by completely or partially circumventing features of the independent claims, alone or freely combined with each other.

BRIEF DESCRIPTION OF THE DRAWINGS

There are now a multitude of possibilities for designing and further developing the container arrangement according to the application, the kitchen appliance according to the application and the method according to the application. In this regard, reference is made on the one hand to the patent claims subordinate to the independent patent claims, and on the other hand to the description of embodiments in connection with the drawing. The drawing shows:

DESCRIPTION OF THE INVENTION

In the following, similar reference signs are used for similar elements.

In particular, the following embodiments are based on a pot as the food receiving element. It shall be understood that the embodiments can be transferred to other food receiving elements. Furthermore, in the following embodiments, an unlocked position is assumed as a first operating position, a locking position is assumed as a second operating position, and a locking state is assumed as a second operating state. Again, the examples can be transferred in a simple manner to other operating positions and/or operating states.

Figure 1:
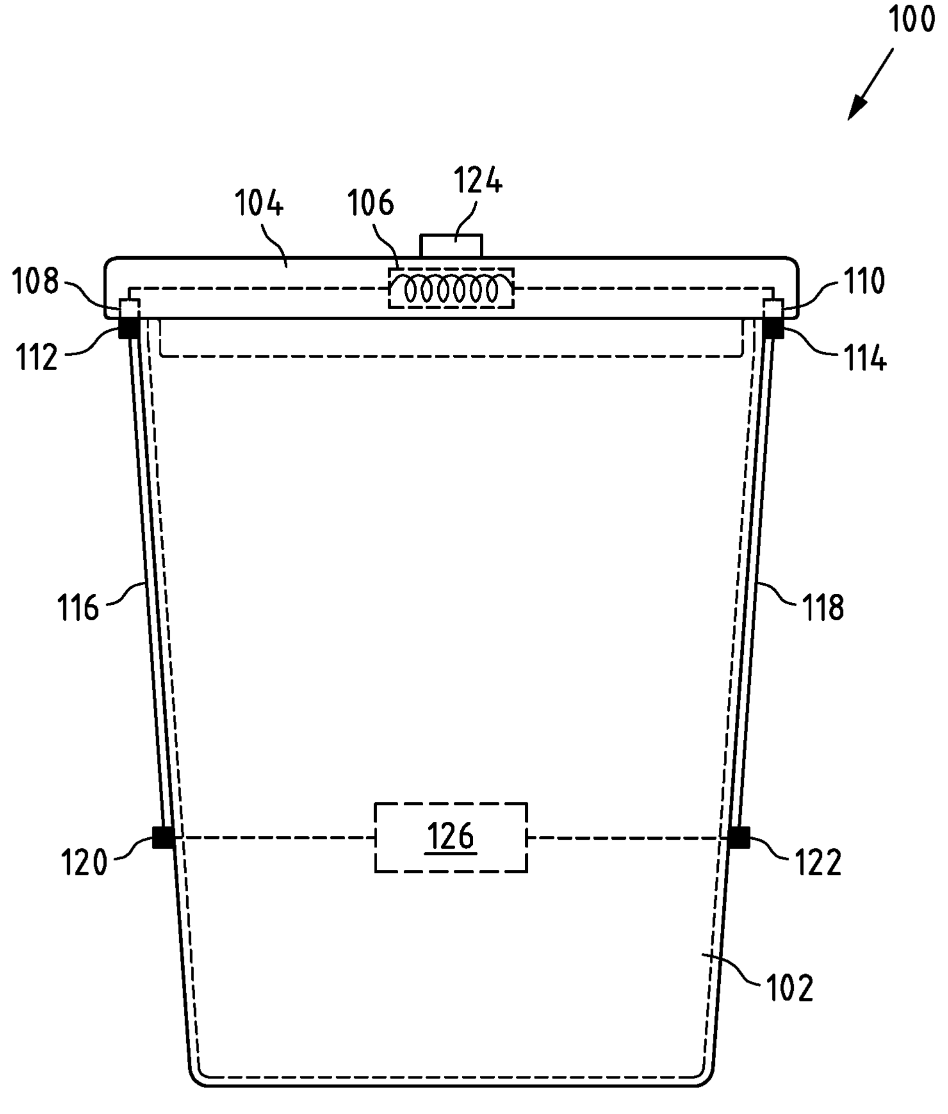
FIG. 1 a schematic view of an embodiment of a container arrangement according to the present application, FIG. 2 a schematic view of an embodiment of a kitchen appliance according to the present application, FIG. 3*a* a schematic view of an embodiment of a pot of a container arrangement according to the present application, FIG. 3*b* an enlarged view of an upper pot contact of the pot according to FIG. 3*a,*

FIG. 1 shows a schematic view of an embodiment of a container arrangement 100 according to the present application for a kitchen appliance, in particular a food processor, configured to prepare food at least partially automatedly. The depicted container arrangement 100 comprises a pot 102 and at least one lid 104. The pot 102 comprise a circumferential pot wall and a pot bottom.

The lid 104 is configured to close an opening of the pot 102. This closed state of the container arrangement 100 is shown in FIG. 1. In particular, the lid 104 is in the locking position in FIG. 1. This means in particular that the lid 104 is (correctly) mechanically locked to the pot 102, i.e., the container arrangement 100 is in the locking state.

The lid 104 is movable relative to the pot 102, in particular between an unlocked position and the (defined) locking position. The locking mechanism can be, for example, a bayonet lock or a similar mechanical lock.

As can further be seen, the lid 104 comprises a reading antenna 106 arranged between a first electrical lid contact 108 and a second electrical lid contact 110, for example an antenna coil 106. In other words, the reading antenna 106 is electrically connected to the first electrical lid contact 108 and the second electrical lid contact 110. Accordingly, the reading antenna 106 electrically connects in particular the lid contacts 108, 110 with each other.

Furthermore, the lid 104 comprises a transponder 124 and tag 124, respectively. The wirelessly readable transponder 124 (also called lid transponder 124) is arranged on respectively in the lid 104 in such a way that the transponder 124 is within the range of the reading antenna 106. In other words, a reading field emitted by the reading antenna 106 always covers the transponder 124. The transponder 124 and the reading antenna 106 are fixed and immovably, respectively, attached to respectively in the lid 104.

The pot 102 comprises at least a first electrical pot connection 116 extending between a first electrical upper pot contact 112 and a first electrical lower pot contact 120, and a second electrical pot connection 118 extending between a second electrical upper pot contact 114 and a second electrical lower pot contact 122. The first lower pot contact 120 and the second lower pot contact 122 are configured to electrically connect to a reading controller 126.

For example, the pot 102 may comprise the reading controller 126, as indicated by the dashed lines in FIG. 1. As described above, the reading controller 126 may in particular be configured to provide an antenna signal. In particular, the antenna signal may be applied to the reading antenna 106 by the reading controller 126 with a closed circuit. In particular, the reading controller 126 may be an RFID reader 126 (e.g., formed by a microcontroller).

According to the application, as shown in FIG. 1, the first lid contact 108 and the second lid contact 110 are arranged on the lid 104 and relative to the upper pot contacts 112, 114 such that an electrical connection is established between the first lid contact 108 and the first upper pot contact 112 and an electrical connection is established between the second lid contact 110 and the second upper pot contact 114 only in the locking position. In other words, an antenna signal can only be applied to the reading antenna 106 by the reading controller 126 when the lid 104 is in the locking position. Only in the locking position is the circuit closed, as shown.

An electrical connection between a lid contact and a pot contact can be contactless or contact based.

Figure 2:
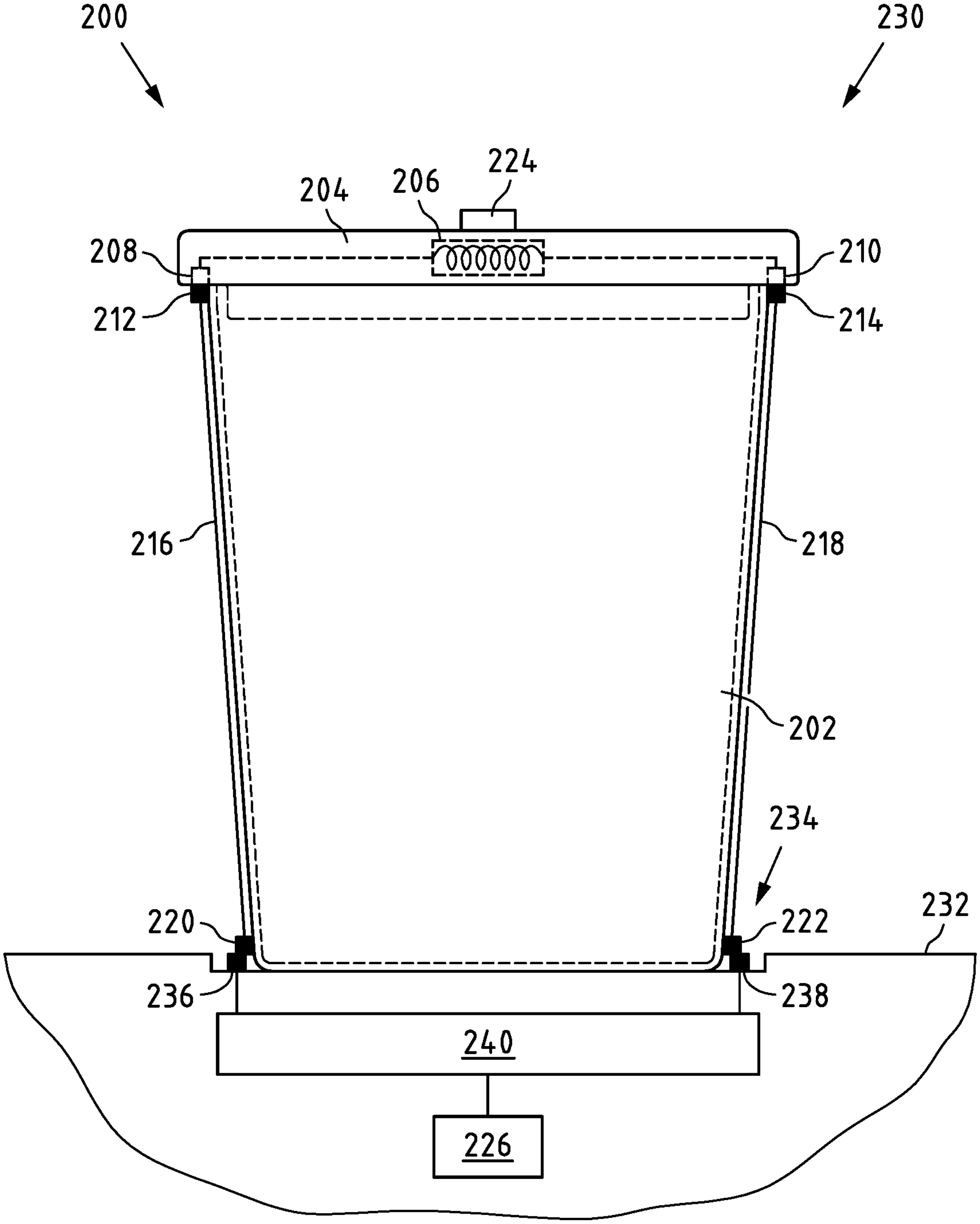

FIG. 2 shows a schematic view of an embodiment of a kitchen appliance 230 according to the present application, in particular with a container arrangement 200. The container arrangement 200 can, for example, be formed essentially in accordance with the container arrangement 100 according to FIG. 1. The kitchen appliance 230 is in particular configured to prepare at least partially automatedly hot food.

The illustrated kitchen appliance 230 comprises an appliance base 232 with a pot receptacle 234. The receptacle 234 is configured to receive the pot 202, in particular at least the pot bottom. As can be seen, the pot receptacle 234 corresponds to the pot 202 of the container arrangement 200 such that an electrical connection is established between the first lower pot contact 220 and a first electrical base contact 236 of the appliance base 232 and an electrical connection is established between the second lower pot contact 222 and a second electrical base contact 238 of the appliance base 232 when the pot 202 is (correctly) arranged in the pot receptacle 234.

In the present embodiment, the appliance base 232 comprises a reading controller 226 electrically coupled to the base contacts 236, 238. In particular, in the present embodiment, the reading controller 226 is coupled to the base contacts 236, 238 via a filtering and matching network 240. In particular, the reading controller 226 may be integrated in the appliance controller of the kitchen appliance 230. In variants of the application, the detection device may also be integrated in the pot. For example, the detection device may be integrated in the pot if the pot is equipped with a smart interface and a corresponding (small) controller is integrated in the pot.

Figure 3A:
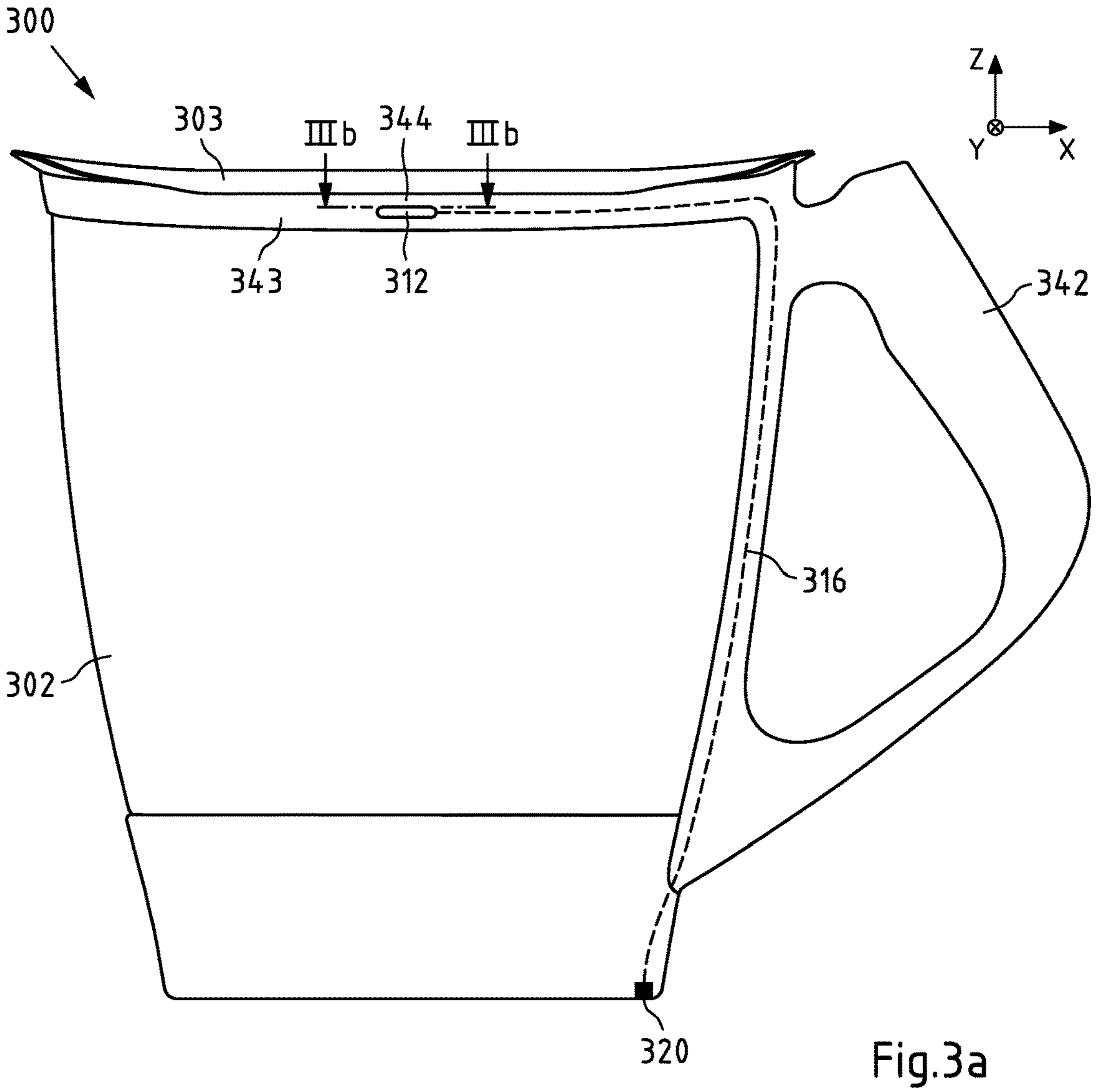
FIG. 3*c* a schematic view of an embodiment of a lid of a container arrangement according to the present application, FIG. 4 a schematic top view of an embodiment according to the present application, FIG. 5 an example of an equivalent circuit diagram of an overall network of a container arrangement according to the present application, FIG. 6 a schematic view of a further embodiment of a kitchen appliance according to the present application, and FIG. 7 a diagram of an embodiment of a method according to the present application.
Figure 3B:
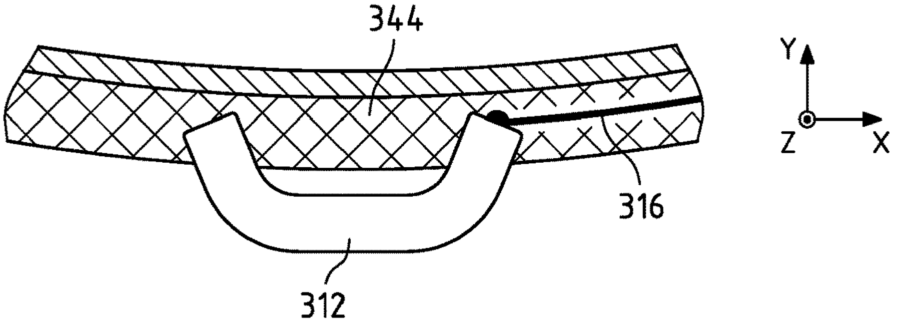
Figure 3C:
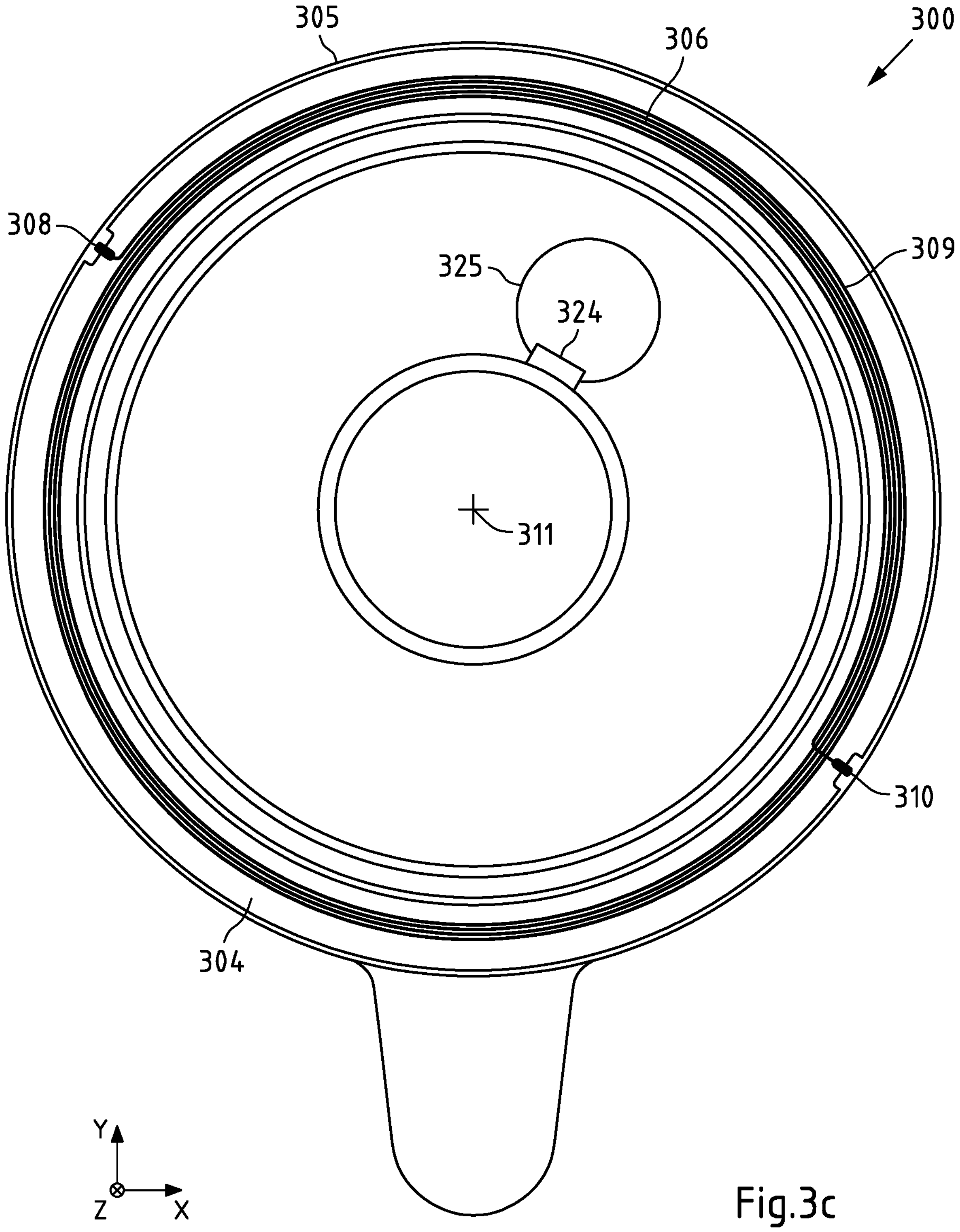

FIG. 3*a* shows a schematic side view of an embodiment of a pot 302 of a container arrangement 300 according to the present application and FIG. 3*c* shows a schematic top view of an embodiment of a lid 304 of the container arrangement 300 structurally corresponding to the pot 302 according to the present application. FIG. 3*b* shows an enlarged section, in particular a top view, of the pot 302 according to FIG. 3*a*.

The pot 302 is preferably formed partly of metal and partly of plastic. In particular, a portion 342 may be formed of plastic. This portion 342 may also form the handle and in particular comprise an at least partially, preferably completely, annular sub-section 343 arranged on the edge 303 of the pot.

A first upper electrical pot contact 312 is arranged at the upper pot edge 303. Preferably, the second upper electrical pot contact (not shown) is arranged on the opposite side of the upper pot edge 303.

The first electrical pot connection 316 extends from the first upper electrical pot contact 312 in particular through the section 342 to the first lower pot contact 320. In particular, the first pot connection 316 may be integrated in the plastic section 342. In particular, the first lower pot contact 320 is arranged in respectively at the bottom of the pot. The further (not shown) pot connection may be formed accordingly.

The upper pot contacts 312 are preferably embedded in the annular plastic sub-section 343. This sub-section 343 preferably comprises a part of the locking mechanism. In particular, the sub-section 343 may have contours for locking the lid 304 to the pot 302 in the defined locking position.

As can be seen from the top view of the associated lid 304, a first lid contact 308 and a second lid contact 310 are arranged on the lid 304, in particular on the outer lid edge 305.

The reading antenna 306 is in particular a (first) antenna coil 306. In particular, the antenna coil 306 may be formed by at least one winding 309, preferably a plurality of windings 309, as shown. In particular, the at least one winding 309 may be formed of a metal, preferably copper.

As can be seen from FIG. 3*c*, the at least one winding 309 runs in particular along the lid edge 305 respectively in the vicinity of the lid edge 305 from the first lid contact 308 to the second lid contact 310. The second lid contact 310 lies in particular on a side of the lid edge 305 opposite the first lid contact 308.

The at least one winding 309 is preferably inserted into the lid base body during manufacturing and then provided with a (not shown) cover (preferably formed of plastic), which can be attached to the lid base body, for example, by ultrasonic welding.

In the present embodiment, the respective connections between the lid contact and the pot contact are contact connections.

In the present embodiment, the lid contacts 308, 310 and the upper pot contacts 312 are formed as exposed electrical contacts 308, 310, 312. Preferably, the lid contacts 308, 310 have a first longitudinal extension in a first direction and the respective associated upper pot contact 312 has a second longitudinal extension in a second direction. As can be seen, there is an angle of between 10° and 90° between the first and second directions (which are in particular in the same plane), in particular of approximately 90° in the present case. In other words, the lid contacts 308, 310 extend at right angles to the pot contacts 312. For example, the lid contacts 308, 310 extend in a vertical direction, while the pot contacts 312 extend in a horizontal direction (or vice versa).

When moving the lid 304 from the unlocked position to the locking position (which can take place, for example, in the form of a rotary movement), the respective contacts 308, 310, 312 slide on top of each other respectively along each other in a contact-based manner. This can prevent impairment of the contact resistance at the respective contacts 308, 310, 312 since any impurities adhering to the contacts 308, 310, 312 are scraped off.

Furthermore, a back lining 344 with an elastic material (e.g., silicone) may be provided at the lid contact 308, 310 or pot contact 312.

The lid transponder 324 is arranged within the range of the antenna coil 306. In particular, the lid transponder 324 is surrounded by the at least one winding 309. The distance of the lid transponder 324 to the lid center 311 is in the present case smaller than the distance of the at least one winding 309 to the lid center 311.

The lid transponder 324 comprises a second antenna coil 325. For example, the lid transponder can be glued on. The transponder 324, in particular the antenna coil 325, can be covered by a not shown cover, for example made of plastic.

Figure 4:
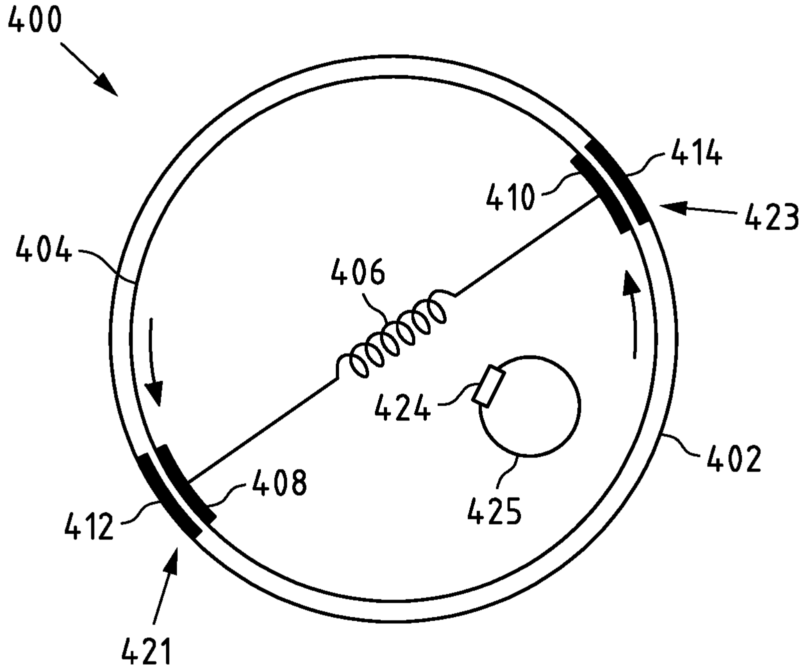

FIG. 4 shows a schematic top view of a further embodiment of a container arrangement 400 according to the present application. In particular, essentially only the differences to the previous embodiments are described below and otherwise reference is made to the previous explanations.

An essential difference to the embodiment according to FIGS. 3*a* to 3*c* is that instead of a respective contact based electrical connection between a lid contact and a pot contact, contactless electrical connections are provided in each case.

The first lid contact 408 is presently formed as a first lid surface element 408 (e.g., by a foil of an electrically conductive material, for example a metal foil) and the second lid contact 410 is formed as a second lid surface element 410 (e.g., by a foil of an electrically conductive material, for example a metal foil).

The first upper pot contact 412 may be formed as a first pot surface element 412 (e.g., by a foil of an electrically conductive material, such as a metal foil) and the second upper pot contact 414 may be formed as a second pot surface element 414 (e.g., by a foil of an electrically conductive material, such as a metal foil).

In the illustrated locking position of the lid 404, the first lid surface element 408 and the first top surface element 412 may form a first coupling capacitor 421. The second lid surface element 410 and the second pot surface element 414 may form a second coupling capacitor 423.

In particular, said surface elements 408, 410, 412, 414 form a respective coupling capacitor 421, 423 only in the locking position of the lid 404. In other words, only in the locking position the antenna signal can be transmitted by the reading controller to the reading antenna 406 (e.g., a (schematically indicated) antenna coil) via said coupling capacitors 421, 423.

The dielectric of the respective coupling capacitor 421, 423 is specified in particular by air and/or the plastic used.

Figure 5:
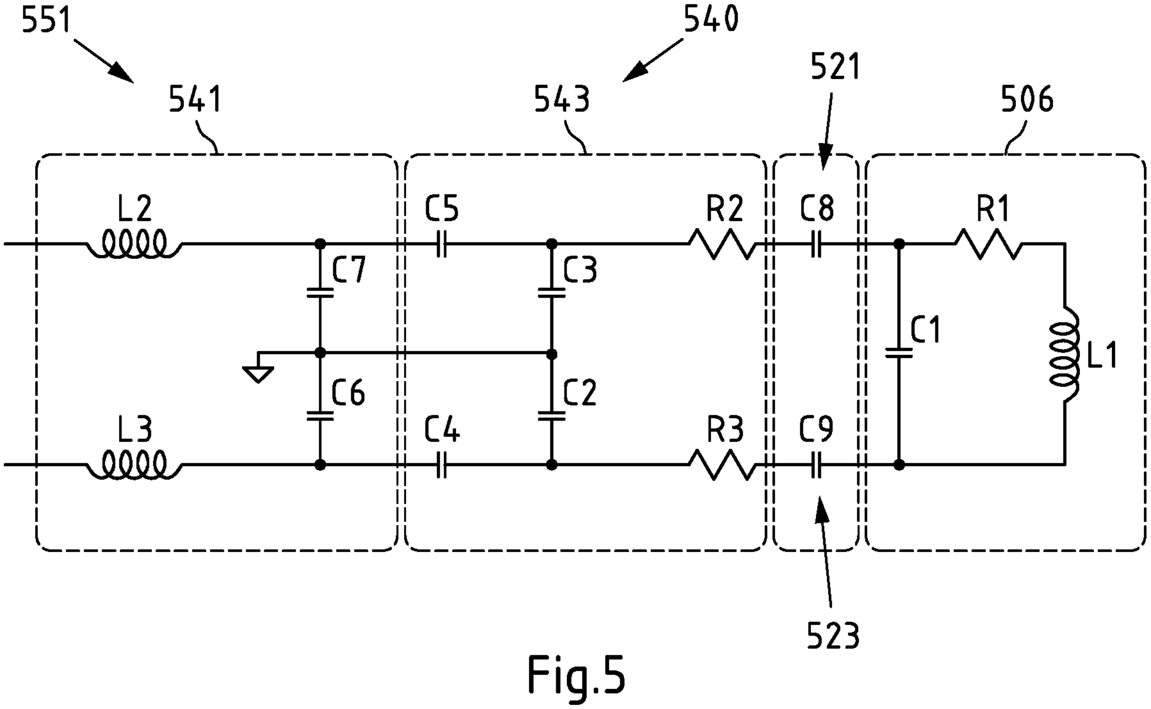

FIG. 5 shows an example of an equivalent circuit diagram of an overall network 551 of a container arrangement according to the present application. In particular, the overall network 551 is shown from the point of view of the reading controller.

As can be seen, the shown overall network 551 comprises a filter and matching network 540 formed by a filter network 541 and a matching network 543, the coupling capacitors 521, 523 and the antenna coil 506. Here, L denotes an inductance, C a capacitance and R a resistance.

In particular, depending on whether the filtering and matching network 540 is arranged in the appliance base, in the pot and/or in the lid, the formed capacitance of the coupling capacitors 521, 523 respectively $C_8$, $C_9$ may contribute to the total impedance in different ways.

If the filtering and matching network 540 is located in the appliance base or in the pot, the illustrated capacities C8 and C9 are created. If the filter and matching network 540 is in the lid, the capacity contributes to the existing capacities C5 and C4. C8 and C9 are omitted in this case. The geometry of the respective capacitor electrodes respectively lid and pot contacts is designed in particular in such a way that the total impedance is in the tolerance band of the specified output impedance of the reading controller, i.e., in particular of the RFID reader, when the lid is in the locking state.

In the case of contact connections between pot and lid, the coupling capacitors $C_8$ and $C_9$ are omitted. A feedback effect on $C_4$ and $C_5$ is also omitted so that this concept is easier to implement from an electronic point of view and, in particular, is more robust.

Figure 6:
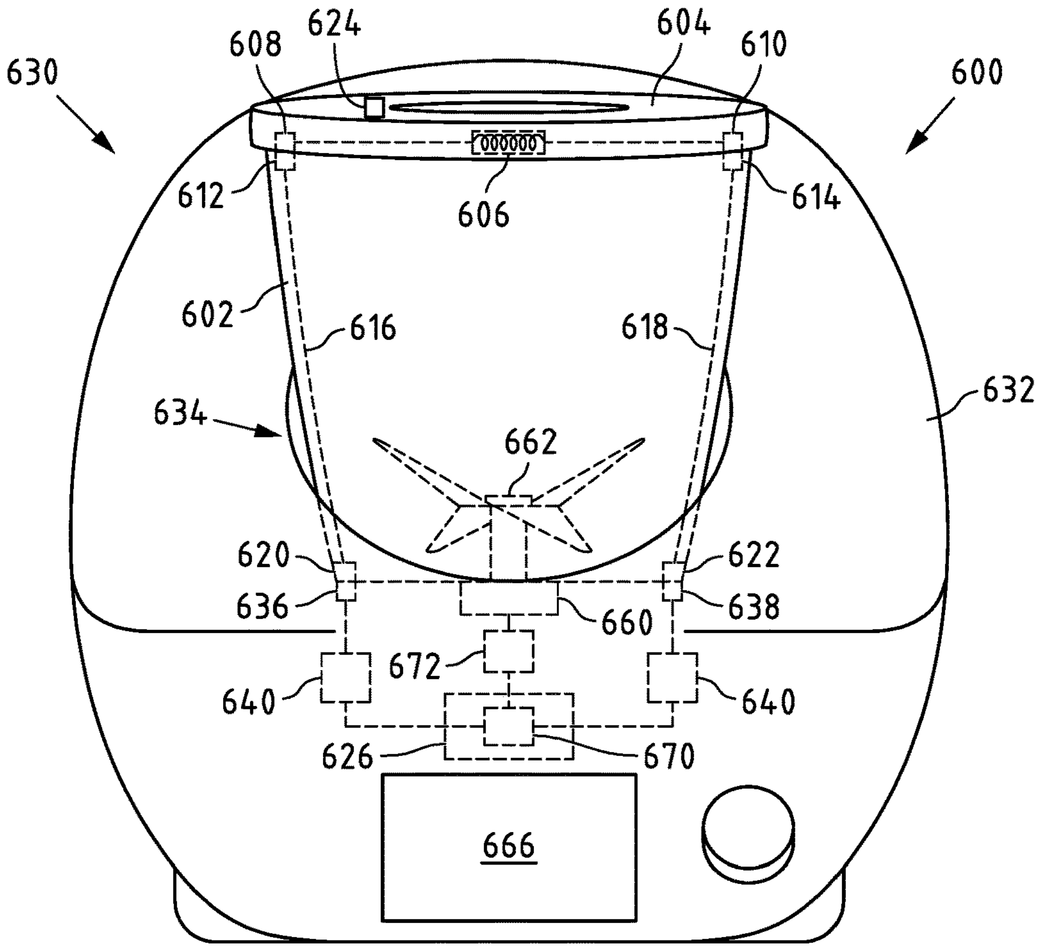

FIG. 6 shows a schematic view of a further embodiment of a kitchen appliance 630 according to the present application. In order to avoid repetitions, only the differences to the previous embodiments are described below and otherwise reference is made to the previous explanations.

As can be seen, the appliance base 632 comprises a tool drive 660. The tool drive 660 is configured to drive and operate, respectively, a kitchen appliance tool 662, which may in particular be positioned in the pot 602. Exemplarily, a kitchen appliance tool 662 is shown as a cutting tool 662. Furthermore, the kitchen base can comprise a control device which, for example, controls and monitors a heater which is integrated in the pot 602.

In particular, the reading controller 626 comprises an evaluation module 670. In particular, the evaluation module 670 is configured to detect a locking state of the lid 604 based on a readable transponder 624. For example, the lid 604 can be moved into the locking state by a user. Once the lid 604 is in the locking position, an electrical connection is established between the first lid contact 608 and the first upper pot contact 612, and an electrical connection is established between the second lid contact 610 and the second upper pot contact 614. An antenna signal is applied to the reading antenna 606 by the reading controller 626 via the established connections so that, in particular, a reading field is generated and transmitted.

The transponder 624 positioned within range receives the reading field and, in particular, extracts the instructions contained therein. Based on the instructions, the transponder 624 generates a response. For example, the transponder 624 outputs the stored data, such as a lid identifier and/or a lid type identifier. In particular, the transponder 624 influences the reading field accordingly. This can be detected by the reading controller 626 so that the stored data is read, i.e., in particular the lid identifier and/or a lid type identifier.

Depending on whether a transponder can be read or not, the locking state is determined. This is because, since the connections to the reading antenna 606 are only established when (and only when) the lid 604 is in the locking position, the locking state can be inferred by reading the transponder 624 and tag 624, respectively:

RFID tag not readable: lid state not locked;

RFID tag readable: lid state locked.

Furthermore, the appliance base 632 comprises a release module 672. The release module 672 is in particular configured to release at least one appliance function only when the locking state of the lid 604 is detected. The release module 672 can in particular be communicatively connected to the evaluation module 670. If no locking state is detected, the at least one appliance function remains locked. Exemplary and non-exhaustive kitchen appliance functions and appliance functions, respectively, are a first cutting function having a first maximum permissible set speed and/or set torque, a further cutting function having a second maximum permissible set speed and/or set torque (different from the first maximum permissible set speed and/or set torque), a first stirring function having a first maximum permissible set speed and/or set torque, a further stirring function having a second maximum permissible set speed and/or set torque (different from the first maximum permissible set speed and/or set torque), a first motor rotation direction, a second opposite motor rotation direction, a first set temperature and/or a first set temperature range of a heater integrated in the food receiving element, a second set temperature (different from the first set temperature) and/or a second set temperature range (different from the first set temperature range) of a heater integrated in the food receiving element, control programs and/or control program set parameters for specific operations, etc.

Preferably, the evaluation module 670 can additionally be configured to determine the lid type based on the read data, in particular the lid type identifier and a stored lid type criterion. Preferably, the lid type criterion can be a previously described assignment table. In particular, the assignment table may additionally store for each lid type the at least one appliance function permitted for this lid type. In particular, after a lid type has been determined, the at least one appliance function permissible for this lid type can be released by the release module 672. The lid type and optionally the permissible appliance function can be determined in particular by comparing the read lid type identifier with the lid type identifiers stored in the assignment table.

The permitted appliance function may comprise, for example, a maximum allowed drive set parameter value. In particular, releasing an appliance function may comprise limiting, for example by the release module 672, the operation of the tool drive 660 to the drive set parameter value stored for this type of lid (e.g., a maximum permissible set speed and/or a maximum permissible torque).

Optionally, the kitchen appliance 630 may have a (visual) display 666, for example a screen. The display 666 may be configured to display the identified lid type. Optionally, an error message (for example, if a locking state was detected but no lid type could be determined) and/or an advisory message (for example, a request for cleaning) may be displayed.

If an accessory is coupled to the lid 604, an accessory transponder of the accessory can additionally be read by the reading antenna 606. The accessory type can be determined, for example by the evaluation module 670, in particular in an analogous manner to the lid type.

The release module 672 may further be configured to release the appliance function based (additionally) on the specific accessory type and an accessory type criterion (e.g., an assignment table in which each accessory identifier may be associated with at least one permitted appliance function). The accessory type criterion may be stored in a data memory of the appliance base 632 accessible by the release module 672. Depending on the accessory type read and the (predefined) accessory type criterion, only the at least one appliance function that is permitted for this accessory type can be released.

Figure 7:
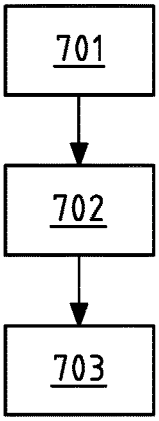

The operation of a container arrangement, such as the container arrangement 600 and in particular the kitchen appliance 630, is described in more detail below with the aid of FIG. 7. FIG. 7 shows a diagram of an embodiment of a method according to the present application. The method is used to determine respectively detect a locking state, for example in the container arrangement 600 of the kitchen appliance 630.

In a first step 701, a detecting, by a reading controller, of the locking state of the container arrangement is performed based on a readable transponder (respectively depending on whether a transponder is readable (or not)), as has already been described.

In an optional step 702, a determining of the lid type of the lid in the locking position can be performed based on the read data of the transponder and in particular a lid type criterion, as has already been described.

In an optional further step 703, a releasing of an appliance function is performed depending on the detected locking state of the lid and optionally depending on the determined lid type, as has already been described.

LIST OF REFERENCE SIGNS

100, 200, 300, 400, 600 container arrangement
102, 202, 302, 402, 602 food receiving element, in particular a pot
303 pot edge
104, 204, 304, 404, 604 lids
305 lid edge
106, 206, 306, 406, 606 reading antenna
108, 208, 308, 408, 608 first lid contact
309 winding
110, 210, 310, 410, 610 second lid contact
112, 212, 312, 412, 612 first upper pot contact
114, 214, 414, 614 second upper pot contact
116, 216, 316, 616 first pot connection

118, 218, 618 second pot connection
120, 220, 320, 620 first lower pot contact
421, 521 coupling capacitor
122, 222, 622, second lower pot contact
423, 523 coupling capacitor
124, 224, 324, 424, 624 transponder
325 second antenna coil
126, 226, 626 reading controller
230, 630 kitchen appliance
232, 632 appliance base
234, 634 pot receptable
236, 636 first base contact
238, 638 second base contact
240, 540, 640 filter and matching network
541 filter network
342 pot section
343 annular section of the pot section
344 back-lining
545 matching network
551 overall network
660 tool drive
662 kitchen appliance tool
666, 766 display
670 evaluation module
672 release module

The invention claimed is:

1. A container arrangement for a kitchen appliance comprising:
a food receiving element, and
at least one lid configured to close an opening of the food receiving element,
wherein the lid is movable relative to the food receiving element between a first operating position and a second operating position different from the first operating position, wherein
the lid comprises at least one reading antenna connected to a first lid contact and a second lid contact,
the lid comprises at least one transponder positioned within range of the reading antenna,
the food receiving element comprises at least a first pot connection extending between a first upper pot contact and a first lower pot contact and a second pot connection extending between a second upper pot contact and a second lower pot contact,
wherein the first lower pot contact and the second lower pot contact are configured to electrically connect to a reading controller,
wherein the first lid contact and the second lid contact are arranged such that an electrical connection is established between the first lid contact and the first upper pot contact and an electrical connection is established between the second lid contact and the second upper pot contact only in the second operating position.

2. The container arrangement according to claim 1, wherein
the reading antenna comprises a first antenna coil, and
the at least one transponder is a passive or an active transponder with a second antenna coil.

3. The container arrangement according to claim 1, wherein
the electrical connection between the first lid contact and the first upper pot contact and/or the electrical connection between the second lid contact and the second upper pot contact is/are a contact based electrical connection.

4. The container arrangement according to claim 3, wherein
the electrical connection between the first lid contact and the first upper pot contact and/or the electrical connection between the second lid contact and the second upper pot contact is/are a contactless electrical connection.

5. The container arrangement according to claim 4, wherein
the first lid contact is formed as a first lid surface element and the second lid contact is formed as a second lid surface element,
the first upper pot contact is formed as a first pot surface element and the second upper pot contact is formed as a second pot surface element, and
in the second operating position of the lid, the first lid surface element and the first pot surface element form a first coupling capacitor and the second lid surface element and the second pot surface element form a second coupling capacitor.

6. The container arrangement according to claim 5, wherein
the at least one transponder comprises at least one readable memory,
wherein at least one lid identifier and/or lid type identifier is/are stored in the at least one readable memory.

7. The container arrangement according to claim 6, wherein
the container arrangement comprises at least one accessory couplable to the food receiving element and/or the lid,
wherein the accessory comprises at least one accessory transponder.

8. The container arrangement according to claim 7, wherein
the accessory transponder is arranged on the accessory such that the accessory transponder is within range of the reading antenna in a coupled state of the accessory with the lid.

9. The container arrangement according to claim 8, wherein
the first lid contact and the second lid contact are arranged on substantially opposite sides of the lid edge, and
the first upper pot contact and the second upper pot contact are arranged on substantially opposite sides of the pot edge.

10. A kitchen appliance, comprising:
the container arrangement according to claim 9, and
an appliance base comprising a reading controller electrically coupled to a first base contact and a second base contact,
wherein the first base contact is electrically connectable to the first lower pot contact and the second base contact is electrically connectable to the second lower pot contact.

11. The kitchen appliance according to claim 10, wherein
the reading controller is configured to detect an operating position of the lid based on a readable transponder.

12. The kitchen appliance according to claim 10, wherein
the reading controller is configured to determine the lid type based on a received lid identifier and/or lid type identifier.

13. The kitchen appliance according to claim 10, wherein
the appliance base comprises a filtering and matching network arranged between the reading controller and the first base contact and the second base contact.

* * * * *